US005684789A

United States Patent [19]
Habeck et al.

[11] Patent Number: 5,684,789
[45] Date of Patent: Nov. 4, 1997

[54] REMOTE CONTROL, LINK INDEPENDENT A/B SWITCH BOX WITH DIAGNOSTIC LOOPBACK

[75] Inventors: Michael Scott Habeck, Naperville; Douglas Alan Kimber, Batavia, both of Ill.

[73] Assignee: Lucent Technologies Inc., Murray Hill, N.J.

[21] Appl. No.: 496,591

[22] Filed: Jun. 29, 1995

[51] Int. Cl.$^6$ .............................. H04M 3/26; H04M 3/08
[52] U.S. Cl. .................... 370/244; 370/248; 370/249; 370/251; 379/5; 379/12
[58] Field of Search ........................ 370/85.4, 85.5, 370/85.12, 85.15, 15, 16, 16.1, 85.14, 452, 241, 242, 244, 247, 248, 249, 250, 251; 379/219, 220, 221, 291, 292, 306, 248, 269, 5, 15, 12, 16, 17

[56] References Cited

U.S. PATENT DOCUMENTS

| | | | |
|---|---|---|---|
| 4,088,845 | 5/1978 | Lalanne et al. | 379/291 |
| 4,692,939 | 9/1987 | Parsons | 379/17 |
| 4,756,018 | 7/1988 | Fujiwara | 379/221 |
| 4,860,284 | 8/1989 | Brown et al. | 370/452 |
| 4,979,118 | 12/1990 | Kheradpir | 379/221 |
| 5,001,741 | 3/1991 | Sayer | 379/15 |
| 5,072,217 | 12/1991 | Georgiou et al. | 379/291 |
| 5,113,431 | 5/1992 | Horn | 379/291 |
| 5,218,604 | 6/1993 | Sosnosky | 370/85.14 |
| 5,241,540 | 8/1993 | Ocheltree | 370/85.14 |
| 5,392,328 | 2/1995 | Schmidt et al. | 379/15 |
| 5,442,628 | 8/1995 | Anderson et al. | 370/85.5 |
| 5,457,740 | 10/1995 | Noda | 379/292 |
| 5,559,877 | 9/1996 | Ash et al. | 379/219 |

*Primary Examiner*—Krista M. Zele
*Assistant Examiner*—Scott Wolinsky
*Attorney, Agent, or Firm*—Michael B. Johannesen

[57] ABSTRACT

A modular switch box which is responsive to a control signal, is diagnosable, and is not dependent upon the type of protocol being switched. There may be a plurality of switch boxes wherein each switch box includes a plurality of inputs and an output. There is a selector for selecting which input is connected to the output and a controller for controlling the selector. There is also a control means for controlling the switch boxes. The switch boxes are connected in a chain so that the input of one switch box is connected to the output of the next, etc., until the output of the last switch box is connected back to the controller. The controller sends a command message to the first switch box which then executes the command and forwards the message on to the next switch box, etc., until the command returns to the controller. In this manner, the controller knows that all switch boxes have received the command. If the command does not return within a reasonable time, then the controller knows that one of the switch boxes or a control link may be faulty. The controller then sends the same command through the chain in the opposite direction. In this manner, all switch boxes will receive the command, except for the one that is faulty.

9 Claims, 4 Drawing Sheets

| 'S' | 'l' | 'n' | 'n' | P | P | '\n' |

*FIG. 4*

| 'A' | 'A' | 'n' | 'n' | '\n' |

*FIG. 5*

| 'A' | 'B' | 'n' | 'n' | '\n' |

*FIG. 6*

| 'S' | 'A' | 'n' | 'n' | P | P | '\n' |

*FIG. 7*

| 'S' | 'B' | 'n' | 'n' | P | P | '\n' |

*FIG. 8*

| 'P' | 'B' | 'n' | 'n' | P | P | '\n' |

*FIG. 9*

REMOTE CONTROL, LINK INDEPENDENT A/B SWITCH BOX WITH DIAGNOSTIC LOOPBACK

TECHNICAL FIELD

This invention relates to the field of A/B switch boxes, and more specifically, to an A/B switch box which is usable in high-reliability, multi-function environments.

BACKGROUND OF THE INVENTION

In general, A/B switch boxes are fairly commonplace in today's computer society. Most frequently, these boxes are used to connect to two personal computers (PCs) to one printer. When one of the computer users wishes to print something, he or she merely turns a switch on the front of the A/B switch box so that the computer is connected to the printer. When the other user wishes to print something, the switch is turned in the other direction and then that person's PC is connected to the printer. Of course, it is known in the art that these A/B switch boxes work in both direction and, for example, one PC may be connected to two different printers by a switch box of this nature.

Recently, such A/B switch boxes are being used in more sophisticated applications. Because of this, such switch boxes are now controlled by computer, rather than a manual switch, so that the switch may be changed in response to a computer command. Further, these switches are being used in many different applications requiring different interfaces. For example, many switch boxes provide an A/B switch for RS232 buses. Still others provide interfaces for T1 trunks and others for X.25 protocol. Each one of the switch boxes has its own internal structure and its own command set for being switched.

As industries move towards more and more distributed processing using sophisticated PCs and/or work stations, such A/B switches become necessary to provide duplex connections to peripherals as used, for example, in telephone switching offices. The difficulty in this architecture is that, for each type of connection (RS232, T1, etc.) the switch box controller needs to be able to speak the language of the switch box and to provide the proper commands. Additionally, these switch boxes are not diagnosable, as required in most sophisticated applications. Finally, adding a new switch box to an existing system requires that the switch box controller be extensively rewired and have complexity added to the controller software.

Therefore, a problem in the art is that there is no switch box system that meets the standards of sophisticated applications while maintaining inexpensive modularity.

SUMMARY OF THE INVENTION

This problem is solved and a technical advance is achieved in the art by a modular switch box which is responsive to a control signal, is diagnosable, and is not dependent upon the type of protocol being switched. In its apparatus form, this invention comprises a plurality of switch boxes wherein each switch box includes a plurality of input ports and an output port. There is a selector for selecting which input port is connected to the output port and a controller for controlling the selector. There is also a control means for controlling the switch boxes. The switch boxes are connected in a chain so that the command input of one switch box is connected to the controller and the command output is connected to the command input of the next switch box, etc., until the command output of the last switch box is connected back to the controller.

In operation, the controller sends a command message to the first switch box which then executes the command and forwards the message on to the next switch box, etc., until the command returns to the controller. In this manner, the controller knows that all switch boxes have received the command. If the command does not return within a reasonable time, then the controller knows that one of the switch boxes may be faulty. In this instance, the controller sends the same command through the chain in the opposite direction. In this manner, all switch boxes will receive the command, except for the one that is faulty.

In order to find and diagnose the faulty switch box, the controller sends a message through each switch box, wherein the control in the switch box recognizes its own ID number in the message, and returns the message to the controller. When one switch box does not respond, the controller sends the message in the other direction until one switch box does not respond. In this manner, the controller can locate a faulty switch box or link by monitor responses.

By use of these switch boxes, it does not matter what format the switched protocol is in, because the same controller can operate switching for any of the common protocols (i.e., RS232, T1, etc.). Thus, standard components may be used in a switch box which is robust enough for high-reliable applications such as a telephone switching office.

BRIEF DESCRIPTION OF THE DRAWINGS

A more complete understanding of the invention may be obtained from the consideration of the following description in conjunction with the drawings in which:

FIG. 3–9 are examples of messages as used by the exemplary embodiment of this invention.

DETAILED DESCRIPTION

Figure 1:
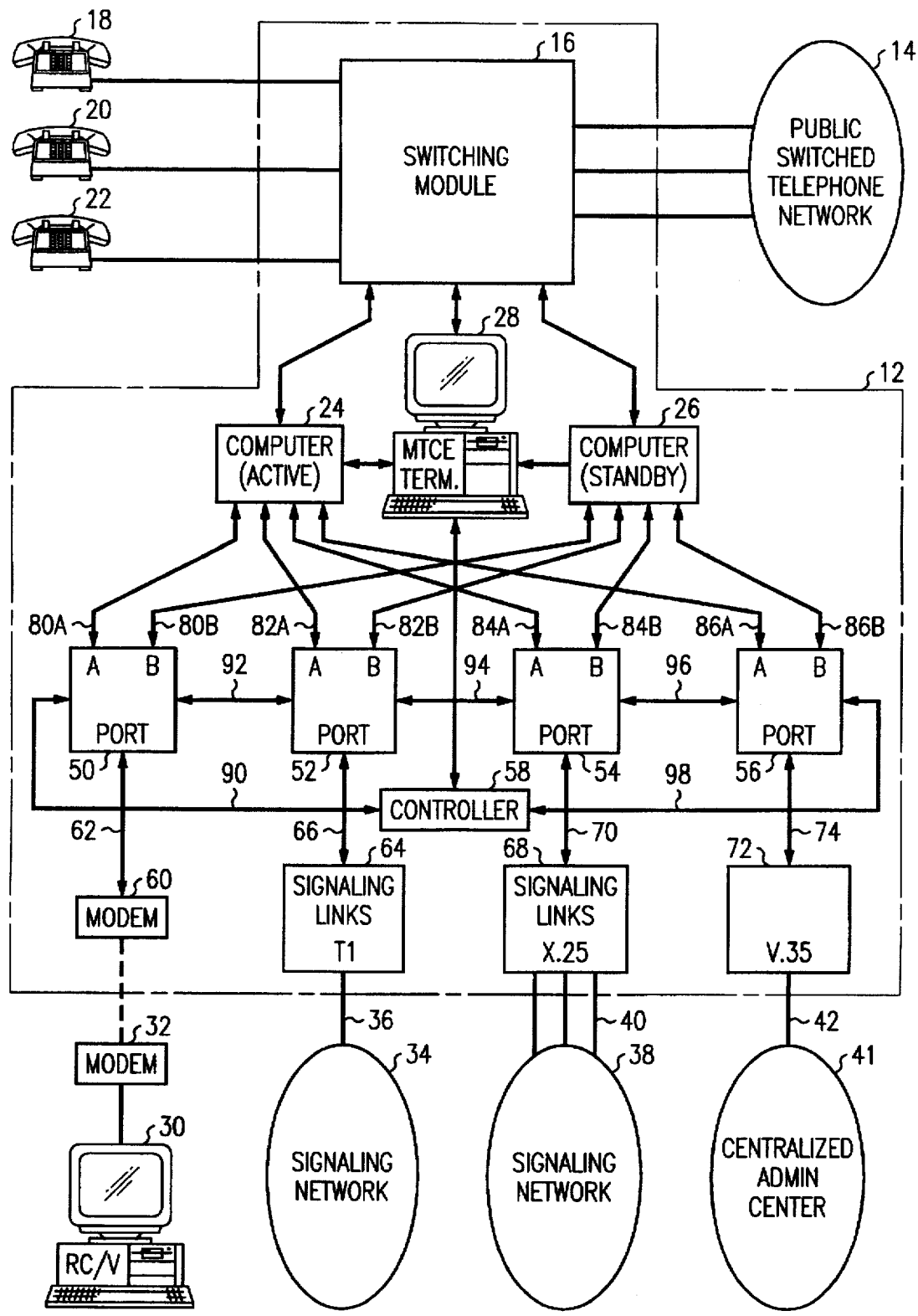
FIG. 1 is a block diagram of a telephone switching system in which an exemplary embodiment of this invention may be used.

FIG. 1 is a block diagram of a switching system in which an exemplary embodiment of this invention is used to connect various functionality blocks to a central processing system. In this diagram, switching network 10 comprises a switch 12 connected to the public switched telephone network (PSTN) 14. Switch 12 comprises a small switching office as would be found in a rural area or, conversely, in a large office building. Switch 12 comprises a switching module 16, such as an SM2000 ®, as manufactured by AT&T. Switching module 16 includes line units (not shown) connecting to telephones such as 18, 20, 22 and trunk units (not shown) for connecting to the PSTN 14. In this exemplary embodiment, instead of being connected to a mainframe or minicomputer, such as the 3 B20 D or 3 B21 D computer, as would be the case in a small AT&T switching office, switch module 16 is connected to a duplex pair of microcomputers or workstations, such as SUN work stations or microcomputers based on the Motorola Power PC or the Intel Pentium® processor. Each computer 24, 26 is in active/standby configuration, wherein this example computer 24 is active and computer 26 is standby. These computers may also go out of service or switch from active to standby, as is known in the art.

Switching office 12, and specifically the configurations of computers 24 and 26, are under control of a maintenance terminal 28 which, in this exemplary embodiment, is also another personal computer. Among the many functions that the administrative module computer such as 24, 26 performs for switching office 12 is connections to telephone network interfaces. For example, switching office 12 is connected to a recent change and verify (RC/V) system 30 by way of modem 32. Further, switching office 12 is connected to a signaling network 34 by way of signaling links 36 which may be, for example, a T1 link. Also, switching office 12 is connected to a further signaling network 38 for inter office signaling to local switches by way of links 40. Finally, switching office 12 is connected to a centralized administration center 41 via V.35 connection 42.

In the prior art, each one of these peripheral connections would include a separate board and/or unit on the administrative module computer. According to the exemplary embodiment of this invention, each peripheral is connected by way of a switch box to either of computers 24 or 26. Each switch box provides that the peripherals are always connected to the active computer, according to this invention. In this exemplary embodiment of this invention, there are four switch boxes 50, 52, 54, and 56 connected to a controller 58. There may be more or fewer switch boxes, depending upon the peripherals connected to the administrative portion of the switch.

In this exemplary embodiment, switch box 50 connects recent change system 30 to computers 24 and 26 by way of modem 60. Modem 60 is connected to the port of switch box 50 by an RS232 bus 62, as is known in the art. Switch box 52 is connected to a signaling link termination system 64 by way of T1 trunk 66. Further, switch box 54 is connected to signaling link X.25 termination box 68, by way of X.25 line 70. Finally, switch box 56 is connected to V.35 termination box 72 via V.35 link 74.

The source of switch boxes may be either computer 24 or computer 26, depending on which one is currently active. To this end, there are input ports 80A and 80B from switch box 50 to computer 24 and 26, respectively, input ports 82A and 82B from switch box 50 to computer 24 and 26, respectively, input ports 84A and 84B for switch box 54 to computer 24 and 26, respectively, and input ports 86A and 86B for switch box 56 to computer 24 and 26, respectively.

Controller 58, comprising a microprocessor and I/O devices, is connected to maintenance terminal 28 so that when one or the other of the computers 24 and 26 becomes active, maintenance terminal 28 notifies controller 58, which causes switch boxes 50, 52, 54, and 56 to connect their respective peripheral interface to the active computer. To this end, controller 58 sends a message to, for example switch box 50 via link 90, which then executes the command to connect its input to the source of the active computer, which may be for example 24, via input port 80A. Thus, data received at destination modem 60 (recent change commands from recent changes system 30) are directed to active computer 24.

Switch box 50 then forwards the command message to switch box 52, via link 92. Switch box 52, responsive to the commands, connects its output port to its input port (82A), so that it connects its destination signaling links 64 to the source active computer 24. Switch box 52 then passes the message on to switch box 54, via link 94, which again causes a connection to be made through switch box 54 between a destination of signaling links 68 and the source active computer 24. The message is then passed to switch box 56, via link 96, which configures its connections so that the destination V.35 termination 72 is connected to the source active computer 24. The message is then sent back to controller 58 via link 98, which completes a round-trip connection. The word "source " is used here to describe the selectable unit connected to the switch box, and the word "destination " is used to designate the fixed unit.

The round-trip connection of the control message provides information to controller 58 that all switch boxes in the chain have received the command and have executed it. If controller 58 had not received the command back after a reasonable amount of time, it would then send the command through the other direction on control link 98 to switch box 56 first, and then from 56 to 54. If controller 58 receives the command back, then it knows that all switch boxes are configured in the proper fashion. If it does not receive the command, which is the more likely case, then controller 58 can perform a "head count " to determine which switch box is malfunctioning as will be described below. However, even with one switch box or control link malfunctioning, all of the other switch boxes are configured such that their respective peripheral is connected to the active computer.

Figure 2:
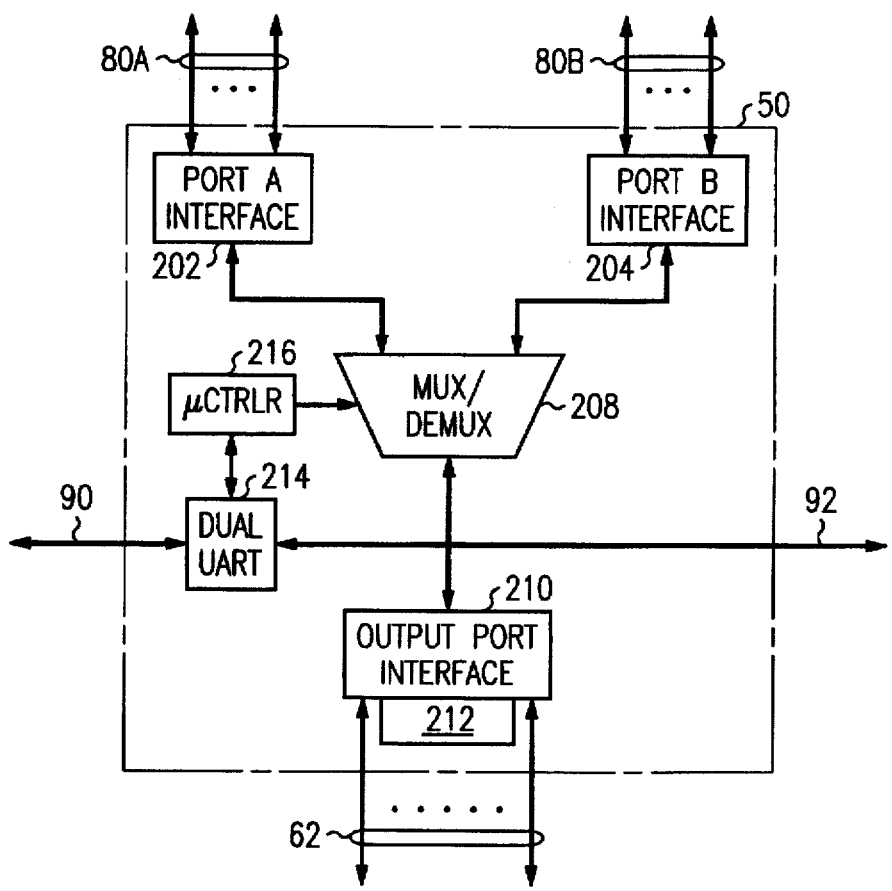
FIG. 2 is a block diagram of a single switch box according to one aspect of the exemplary embodiment of this invention.
Figure 3:

Turning now to FIG. 2, a block diagram of a switch box such as switch box 50, is illustrated. Switch box 50 is merely an example, as all switch boxes in this embodiment are basically identical. In describing this switch box, the word "input " is used to designate the selectable ports, and the word "output " is used to designate the fixed or non-selectable ports. This definition does not imply one way communication; all ports are bi-directional. In switch box 50, there are a pair of identical input port interfaces 202 and 204. These input port interfaces provide the connection to the computers 24 and 26 (FIG. 1). These input port interfaces may include up to eight different connections if necessary for the specific embodiment. Port interface A and port interface B comprise an RJ 45 jack, as is known in the art.

Input port interface A 202 and input port interface B 204 are connected to a multiplexer/demultiplexer 208. Multiplexer/demultiplexer 208 comprises, in the preferred embodiment, latching relays. Latching relays were selected so that if, for example, there is a power failure, the last configuration remains active. However, it is within the scope of one skilled in the art to make multiplexer/demultiplexer 208 using entirely electronic components. Multiplexer/demultiplexer 208 is connected through a bi-directional link to output port interface 210. Output port interface 210 connects one or more links to the peripheral, using whatever connection attachment is necessary. In this specific embodiment, output port 210 has a pin block 212 to which various connectors may be connected. Therefore, one skilled in the art can readily build a T1 connector to a pin block such that a T1 could connect to pin block 212. Conversely, RS232 bus to pin block 212 connector could also very easily be made. Thus, one design of switch box 50 may support a plurality of different applications.

Switch box 50 is connected to controller 58 by way of command link 90. Command link 90 is connected to a dual Uart 214, as is known in the art. Dual Uart 214 receives the command and passes the command on to microcontroller 216. Microcontroller 216 sends the command via dual Uart 214 to the next switch box through command control line 92. Microcontroller 216 also interprets the command, and, if the command is for itself, causes the multiplexer/demultiplexer 208 to connect output port interface 210 to input port A interface 202 or input port B interface 204. Further, microcontroller 216 may also report diagnostic functions and send messages back through dual Uart 214 to controller 58 (FIG. 1). The deselected port, "B" above, is looped back to standby computer 26. Standby computer 26 can then test the connector to the switch box. In this manner, a switch box, which is robust enough for central office application, may be used to interface multiple applications to an active processor or processing unit. FIGS. 3–9 illustrate typical control messages used by controller 58 (FIG. 1) to control switch boxes 50, 52, 54, and 56. In this exemplary embodiment, all messages are in 7 bit ASCII format transmitted at 9600 baud with even parity and one stop bit. All messages conform to the form of FIG. 3, wherein the first two characters, "ID," is the message identification in ASCII characters. The next two characters represent the message sequence number in ASCII hexadecimal. The switch boxes never modify the sequence number in messages and responses so that controller 58 can match responses with requests. The blocks labeled "B" is the message body, wherein the length and content depends on the message ID. The new line character ends the message. Switch boxes discard all messages that do not have a new line, have a parity error, framing errors, or are otherwise corrupt, in order to maintain integrity of the system.

An example of a typical message is shown in FIG. 4. In this message, each switch box is assigned an ID sequence number for later diagnostics and control purposes. In this instance then, the first character is "S" and the second character is "I," to show that it is an assignment of the ID number, then the next two characters are the sequence number which, in this case, are shown as "NN" and then the next two letters, "PP" are initially set to hexadecimal zero by the controller, and then, of course, the new line character. The first switch box to receive the message sets its own ID to the value in PP (which is zero), increments the value of PP (to 1), and then forwards the message to the next switch box. This message chain sets every switch box's ID. The controller, which receives the message back, knows how many switch boxes are in the chain by reading "PP."

In the example of FIG. 5, all switch boxes in the chain are instructed to select input port A. In the example of FIG. 6, all switch boxes in the chain are instructed to switch to input port B. In the example of FIG. 7, a selective port switch to port A is shown, where "S" means selective, A is the port switch, "NN" is the message sequence number, and "PP" is the ID number of the switch box (that was set according to message in FIG. 4). FIG. 8 shows a selective port switch to input port B.

FIG. 9 shows a message (referred to as a "ping" message) to diagnose connections. A switch box receiving the message checks the "PP" field for a match with its own ID. If the ID numbers do not match, the switch box forwards the message to the next switch box. If there is a match, then the switch box returns the message to the incoming link rather than forwarding it to the outgoing link. When the controller receives the message, it matches the sequence number and knows that the switch box with the ID of "PP" is active.

Figure 10:
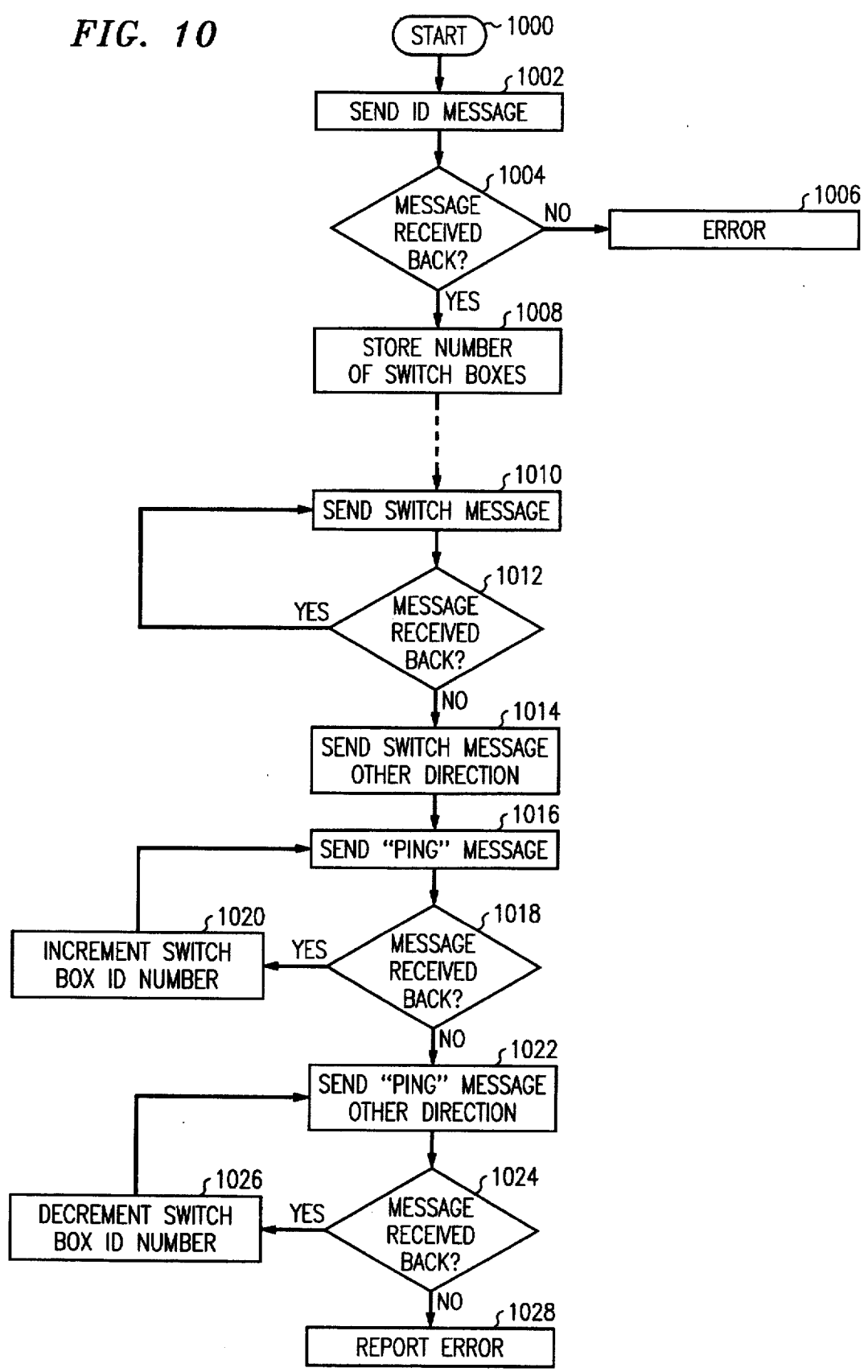
FIG. 10 is a flow chart of the operation of the controller of FIG. 1.

Turning now to FIG. 10, a flow chart according to the exemplary embodiment of the controller 58 is shown. Operations start in oval 1000 and move to action box 1002, where the ID message (FIG. 4) is sent. By sending the ID message, the controller is setting the ID number of each switch box in the chain. Processing moves to decision diamond 1004, where a determination is made whether the message is received back. This determination is made by checking the stored sequence number against the sequence number of any message received. If the message has not been received back within a reasonable time, then an error condition has been encountered and error correction is taken in box 1006.

If, in decision diamond 1004, the message was received back, then processing continues to action box 1008, where the number of switch boxes is stored. Processing then continues to the regular operational loop, wherein messages are sent in action box 1010. Such messages could be switching all ports to A (FIG. 5), switching all ports to B (FIG. 6), switching selective ports to A (FIG. 7), or switching selective ports to B (FIG. 8). A determination is made in decision diamond 1012 whether the message was received back again by checking the sequence number against the sequence number stored when the message was sent. If the message is received back within a predetermined period of time, then processing returns to the normal loop, waiting for another command.

If, in decision diamond 1012, the message was not received within a reasonable period of time, then processing proceeds to action box 1014, where the previous message (one of the switch messages) is sent in the other direction. This provides that all switch boxes receive the message, except for the one which apparently could not process the message. Processing then proceeds to box 1016, where a controller sends the ping message (FIG. 9) to each of the switch boxes in its list. Processing continues to decision diamond 1018, where a determination is made whether the ping message has been received back from that specific switch box. If it has, then processing continues to action box 1020, where the switch box ID is incremented and then processing returns to action box 1016 where the ping message is sent to the next switch box.

If, in decision diamond 1018, the message has not been received back from a specific switch box, then processing continues to action box 1022, where the ping message is sent in the other direction. In decision diamond 1024, a determination is made whether the message was received back. If it was, then processing proceeds to action box 1026, where the switch box ID number is decremented, and processing returns to action box 1022, where the ping message is sent to the next switch box.

If, in decision diamond 1024, one of the switch boxes did not respond, the ID number is compared to the ID number of the switch box that did not respond in decision diamond 1018. If the ID number is the same, then an error is reported in box 1028 of a bad switch box. If the ID numbers differ by one, then the link between the two switch boxes is bad and an error is reported in box 1028. If the ID numbers differ by more than one, then multiple errors are likely (more than one switch box, more than one link, a switch box and a link, etc.), and are reported in box 1028. In this manner, the faulty unit(s) may be identified for easier maintenance.

It is to be understood that the above-described embodiment is merely an illustrative principle of the invention, and that many variations may be devised by those skilled in the art, without departing from the scope of the invention. It is, therefore, intended that such variations be included within the scope of the claims.

We claim:

1. A switching system for connecting a plurality of destinations to one of a plurality of sources said system comprising:

a plurality of switch boxes, each of said plurality of switch boxes including a plurality of inputs, each of said plurality of inputs being connected to a different one of said plurality of sources, an output connected to one of said plurality of destinations, selecting means for connecting one of said plurality of inputs to said output, and a controller for controlling said selecting means;

control means for controlling said plurality of switch boxes, said control means having a first port and a second port; and a plurality of interconnecting means for interconnecting said control means and each controller in said plurality of switch boxes in a circular chain;

said control means including means for generating a command message, said command message including a command, means for sending said command message via said first port to each controller in said circular chain and means for receiving said command message via said second port after passing through each controller in said circular chain, each controller in said plurality of switch boxes including means for executing said command in said command message and means for passing said command message to a successive element in said circular chain.

2. A switching system according to claim 1 wherein said selecting means comprises a multiplexer/demultiplexer.

3. A switching system according to claim 1 wherein said selecting means comprises a plurality of latches.

4. A switching system according to claim 1 wherein said control means comprises a microprocessor.

5. A switching system according to claim 1 wherein said controller comprises a microprocessor.

6. A method for using a controller to send a command message to a plurality of switch boxes for the purpose of controlling the connection of a plurality of destinations to one of a plurality of sources, said method for use in a switching system comprising a plurality of switch boxes and a controller, said command message including a command, said controller having a first port and a second port, said plurality of switch boxes and said first and second ports of said controller being connected in a circular chain by a plurality of control links, said method comprising the steps of:

said controller sending a command message through said first port to said plurality of switch boxes in said chain;

each switch box in said chain executing said command in said command message and passing said command message to another of said plurality of said switch boxes in said chain; and waiting for the return of said command message to said second port of said controller, so that said controller can determine whether all of said plurality of switch boxes received said command message.

7. A method according to claim 6 further including the step of, if, after a predetermined time period, said command message does not return to said second port of said controller, said controller sending a second command message including said command through said second port to said plurality of said switch boxes in said chain.

8. A method according to claim 7 wherein each switch box in said chain is identified by a number, said method further comprising the step of, after sending said command message through said second port, said controller sending a ping message to each switch box in said chain through said first port, wherein, when a switch box recognizes its own number, it returns said ping message to said controller.

9. A method according to claim 8 wherein, if said controller does not receive said ping message back within a predetermined time period, said controller sends said ping message said second port.

* * * * *